(12) United States Patent
Lahetkangas et al.

(10) Patent No.: US 7,822,023 B2
(45) Date of Patent: Oct. 26, 2010

(54) ROUTING DATA PACKETS THROUGH A WIRELESS NETWORK

(75) Inventors: Keijo Lahetkangas, Oulu (FI); Kai Mustonen, Oulu (FI)

(73) Assignee: Nokia Corporation, Espoo (FI)

( * ) Notice: Subject to any disclaimer, the term of this patent is extended or adjusted under 35 U.S.C. 154(b) by 1187 days.

(21) Appl. No.: 10/512,260

(22) PCT Filed: Apr. 14, 2003

(86) PCT No.: PCT/IB03/01836

§ 371 (c)(1),
(2), (4) Date: Oct. 22, 2004

(87) PCT Pub. No.: WO03/098882

PCT Pub. Date: Nov. 27, 2003

(65) Prior Publication Data

US 2005/0169257 A1 Aug. 4, 2005

(30) Foreign Application Priority Data

May 16, 2002 (GB) .................................. 0211286.0

(51) Int. Cl.
*H04L 12/28* (2006.01)
(52) U.S. Cl. ...................................... 370/389
(58) Field of Classification Search ................. 370/389, 370/328, 355, 356, 395.21, 229–235, 254, 370/255, 310, 351, 392, 394, 395.4–395.73, 370/412, 429, 468; 455/41.2, 44, 414.1, 455/414.2, 422.1, 445, 456 M, 456.2 M, 455/518, 552, 557, 574, 67.11
See application file for complete search history.

(56) References Cited

U.S. PATENT DOCUMENTS 5,224,099 A * 6/1993 Corbalis et al. ............. 370/412

(Continued)

FOREIGN PATENT DOCUMENTS

JP 2001-274810 10/2001

(Continued)

OTHER PUBLICATIONS

Lin et al, "Bandwidth Routing in Ad Hoc Wireless Networks", IEEE Globecom 1998. Globecom '98. The Bridge to Global Integration, Sydney, Nov. 8-12, 1998, IEEE Global telecommunications Conference, New York, IEEE, vol. 4, Nov. 8, 1998, pp. 2477-2482, XP000894478.

(Continued)

*Primary Examiner*—Kwang B Yao
*Assistant Examiner*—Kenan Cehic
(74) *Attorney, Agent, or Firm*—Mintz, Levin, Cohn, Ferris, Glovsky and Popeo, P.C.

(57) ABSTRACT

The present invention is concerned with a method and a system for improving the quality of service in wireless networks and in particular in dynamically changing mobile ad hoc networks. The method of routing data packets through a network depending on priority information, which is based on the bandwidth requirements of each packet and the distance to the destination. To achieve a particular quality of service, a priority indicator is used to forward each packet at each node in the network. The priority indicator being determined based on a pre-determined relation between the distance and bandwidth information.

13 Claims, 2 Drawing Sheets

| | | Hops to destination | | | |
|---|---|---|---|---|---|
| | | 1 | 2 | 5 | 10 |
| Data | 1 | H | M | L | L |
| Speed | 2 | H | H | M | L |
| Class | 3 | H | H | H | M |

U.S. PATENT DOCUMENTS

| | | | |
|---|---|---|---|
| 6,047,326 A | 4/2000 | Kilkki | |
| 6,081,505 A | 6/2000 | Kilkki | |
| 6,443,891 B1* | 9/2002 | Grevious | 600/302 |
| 6,657,965 B1* | 12/2003 | Shaffer et al. | 370/238 |
| 6,744,740 B2* | 6/2004 | Chen | 370/255 |
| 6,799,202 B1* | 9/2004 | Hankinson et al. | 709/219 |
| 6,816,484 B1* | 11/2004 | Kreten et al. | 370/360 |
| 6,859,435 B1* | 2/2005 | Lee et al. | 370/231 |
| 7,113,746 B2* | 9/2006 | Payton et al. | 455/41.2 |
| 2001/0033556 A1 | 10/2001 | Krishnamurthy et al. | |
| 2002/0036987 A1* | 3/2002 | Garcia-Luna-Aceves et al. | 370/238 |
| 2002/0039357 A1* | 4/2002 | Lipasti et al. | 370/338 |
| 2002/0051427 A1* | 5/2002 | Carvey | 370/254 |
| 2002/0061001 A1 | 5/2002 | Garcia-Luna-Aceves et al. | |
| 2003/0016655 A1 | 1/2003 | Gwon | |
| 2003/0026268 A1* | 2/2003 | Navas | 370/400 |
| 2003/0189948 A1 | 10/2003 | Sashihara | |
| 2004/0203820 A1* | 10/2004 | Billhartz | 455/452.1 |
| 2008/0056267 A1* | 3/2008 | Hill et al. | 370/392 |

FOREIGN PATENT DOCUMENTS

| | | |
|---|---|---|
| WO | WO 99/46899 | 9/1999 |
| WO | WO 02/19636 A1 | 3/2002 |

OTHER PUBLICATIONS

Broch et al., "A Performance Comparison of Multi-Hop Wireless Ad Hoc Network Routing Protocols", Mobicom '98. Proceedings of the 4th Annual ACM/IEEE International Conference on Mobile Computing and Networking., Texas Oct. 25-30, 1998, Annual ACM/IEEE International Conference on Mobile Computing and Networking, New York, Oct. 25, 1998, pp. 85-97, XP000850259.

EPO Communication Pursuant to Article 94(3) EPC dated Dec. 4, 2009, issued in connection with counterpart European application No. 03719018.8-2413.

European Office Action dated Sep. 17, 2008 for Application No. 03 719 018.8.

* cited by examiner

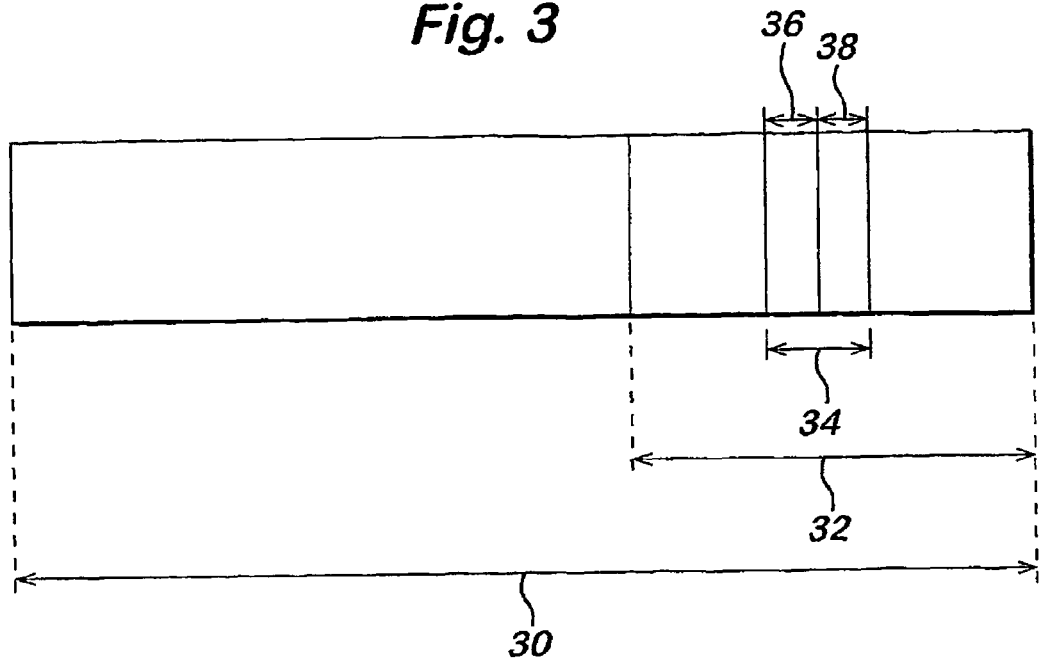

ROUTING DATA PACKETS THROUGH A WIRELESS NETWORK

The present invention is concerned with the quality of service in wireless networks and particularly but not exclusively the quality of service in dynamically changing networks such as mobile ad hoc networks.

In many modern communication systems an important parameter is the so-called quality of service (QoS) which broadly speaking provides an indication of the bandwidth, allowed delay, jitter and/or data errors for supporting a particular application over a communication path. Such a communication path might for example be established between a sending application and a receiving application over a communication network which routes messages between nodes of that network on a hop-per-hop basis. Therefore if a sending application is aware of the quality of service that can be supported over a particular route through the network, then it is able to judge whether a particular application can be run at that instant in time. For example, if a sending terminal wanted to video conference with a receiving terminal it would be useful to know if the various routes through the communication network are able to support the bandwidth requirements imposed by such a video conference application.

A mobile ad hoc network is an autonomous system of mobile routers which are connected to one another over wireless communication channels. Due to the mobile nature of such a network the routers are free to move randomly so that the network architecture is of an arbitrary nature. In particular an Internet Engineering Task Force has set up a Mobile ad hoc Network (MANET) working group in trying to standardise work in this area. By its definition, a Mobile ad hoc Network does not have defined communication routes due to its ever-changing topology and as such it is problematic in trying to establish a quality of service (QoS) for a particular application to be executed over such a network. For this reason, it is more realistic to consider the statistical nature of QoS in ad hoc networks, which can be done by calculating the probability of achieving a particular QoS over an ad hoc network.

The aim of the present invention is to provide a greater determination of prioritising traffic over a network.

According to the system described in the following for achieving a simple, statistical view of the QoS, the QoS is approximated with parameters of bandwidth and distance.

According to one aspect of the present invention there is provided a method of routing data packets through a wireless network, the method comprising: identifying bandwidth information for each data packet; determining distance information for each data packet; using the bandwidth and distance information to determine a priority indicator for transmitting the data packets over the network; and using the priority indicator at each node in said network to control transmission of the data packets through the network.

According to a further aspect of the present invention there is provided a system for routing data packets through a wireless network, the system comprising: means for establishing bandwidth information for each data packet; means for determining distance information for each data packet; means for using the bandwidth and distance information to determine a priority indicator for transmitting the data packets over the network and arranged to control transmission of the data packets through the network based on the priority indicator.

Preferably, the priority indicator is determined based on a substantially inverse relationship between the bandwidth and distance information to allow for fair allocation of all data packets.

Alternatively, the priority indicator is determined based substantially on distance information so that packets having a short distance are forwarded with highest priority irrespective of the bandwidth.

Preferably, the bandwidth and distance information are transmitted within a header portion of each data packet.

Preferably, the priority indicator controls the order that each node forwards each received data packet so that packets having highest priority are forwarded first and wherein the priority indicator is selected from one of three priority levels being high, medium and low. Preferably, for data packets having the same priority indicator, those having the shortest distance are given highest priority.

Preferably, the data packets are categorised into classes depending on their bandwidth requirements.

Advantageously, a proactive routing protocol is implemented and each data packet includes the distance information upon entry to the network.

Alternatively, a reactive routing protocol is applied so that each node of the network is able to establish reactively the distance information.

Preferably, the distance information is comprised of the distance in hops to the destination. Alternatively, the distance information is comprised of the distance in hops from the source.

The present invention will now be described by way of an example with reference to the accompanying drawings, in which;

FIG. 3 shows the priority data within the header of the data packet according to one embodiment;

FIG. 4 shows a QoS routing strategy according to a first embodiment of the present application; and FIG. 5 shows a QoS routing strategy according to a second embodiment of the present application.

Figure 1:
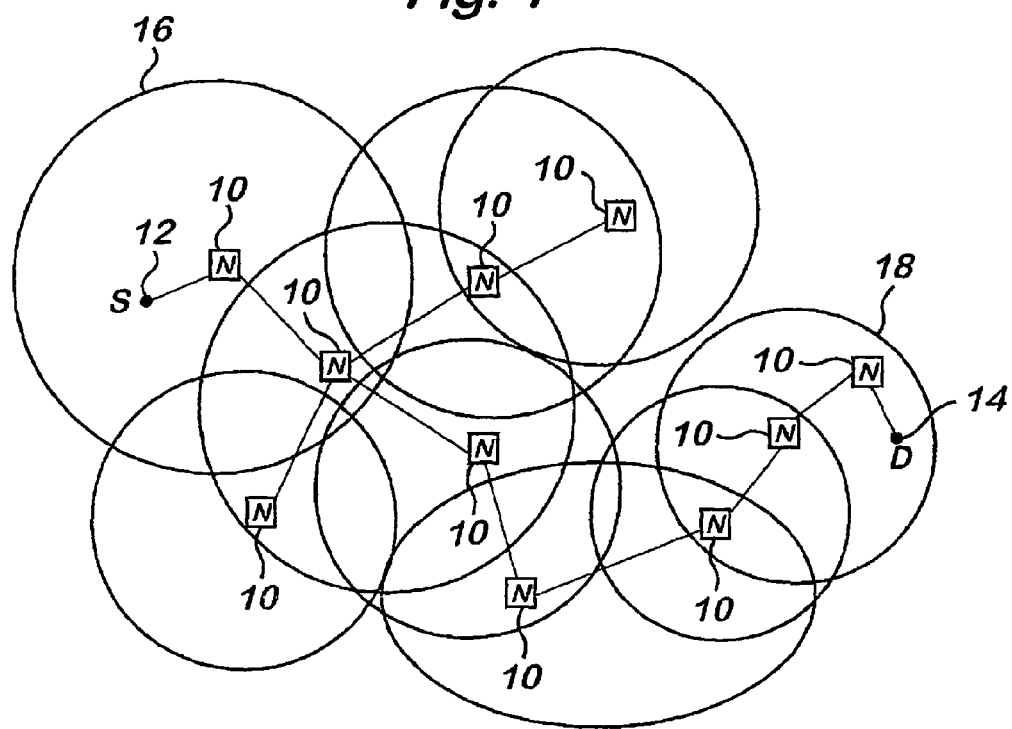
FIG. 1 shows an example of an ad hoc network.
Figure 2:
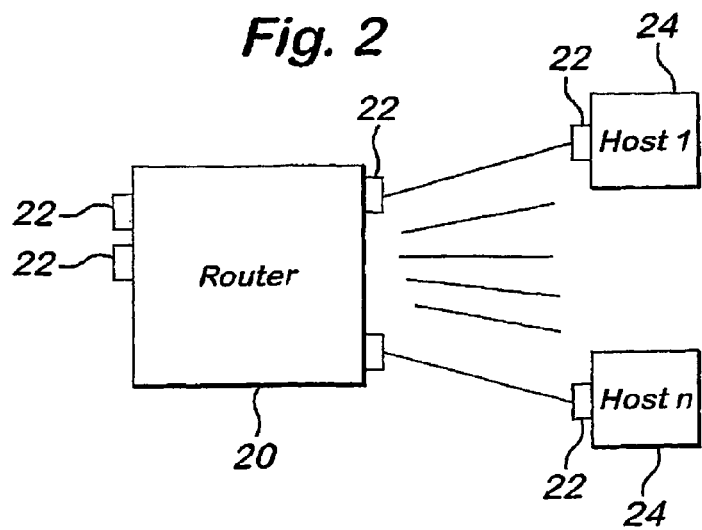
FIG. 2 shows the structure of a node of the ad hoc network according to one embodiment.

FIG. 1 shows an example of a Mobile ad hoc Network according to the present invention. The Mobile ad hoc Network will from now on be referred to as MANET, which is a popular abbreviation used in this field to indicate these types of networks. It can be seen that the MANET network is comprised of a plurality of network nodes 10, each node having at least one radio transceiver for transmitting and/or receiving from a neighbouring node. As is the case with traditional mobile networks, each node will have a transmission range which defines a particular broadcast area or so called "cell". At a deeper level, FIG. 2 shows an example of a block diagram representing the structure of each node of the network according to one embodiment of the present invention. FIG. 2 shows each node comprising a router 20, a plurality of wireless transceiver communication devices 22 and a plurality of hosts 24. It should be appreciated that while FIG. 2 indicates the transceiver device 22 to be attached to the router 20 and host units 24, in an alternative embodiment the transceiver device 22 need not be physically integrated into these units as shown. In a preferred embodiment the transceiver devices 22 are designed to transmit and/or receive radio frequency (RF) communication wireless communication channels. Such transceiver units 22 are typically equipped with RF antennas, which are capable of broadcast communications, point to point communications, etc.

FIG. 1 represents a snap-shot of a MANET network at a particular instance in time, because by definition the ad hoc nature of such a network means that the topology shown in FIG. 1 is expected to change dynamically over time. That is, the nodes 10 in a MANET network are free to move arbitrarily. Also, the connectivity or communication links between nodes for example may be removed for some reason or another, one node no longer exists, the nodes have moved out of the cell transmission range, etc. Also communications over wireless networks are typically slower than can be expected from corresponding fixed-line networks, since wireless networks have other limitations such as multi-path effects, noise and other sources of interference. Therefore, it should be appreciated that the dynamically changing topology and wireless nature of the MANET network result in even more emphasis being placed on bandwidth capacity than for a conventional fixed-line network (for example, the Internet) and the problems facing the designers of MANET networks are slightly different to those faced by their fixed-line counterparts.

However, as in fixed-line networks, one way of transmitting communications across a network is using a packet-switched system such as the Internet where data packets are routed through a communications network on a hop-by-hop basis to reach their final destination. The Internet Protocol (IP) is one embodiment of a protocol which can be used to transfer packets across a MANET network. The Internet Protocol is predominately concerned with the network layer of the Open System Interconnection (OSI) model and as such overcomes the vendor-specific limitations of certain communication devices operating at the lower levels, ie. the physical or application layers (OSI layers 1 and 2). For example, in one embodiment of the present invention a router 20 as shown in FIG. 2 may have communication links to more than one host 24. Each interface 26 connecting the various hosts 24 to the router 20 can be of a different wireless technology. However, using IP addressing for each host 24 and the IP protocol, it is possible to route messages to these hosts at the network level irrespective of the different physical interfaces 26 used. More particularly, addressing a particular host device 24 in a MANET network can be done by IP addressing where each node has a node identifier and a interface identifier corresponding to a particular interface 26 of the addressed host device 24.

Therefore, in a particular application a sending host 12 in a first cell 16 is able to communicate with a receiver host (destination) 14 in another cell 18. The sending host 12 and the destination host 14 can transfer data packets using IP address according to the IP protocol.

At a higher level, broadly speaking there are two approaches which can be taken when deciding on the routing approach to be used for a particular MANET network, i.e. a reactive or proactive based approach. For a reactive approach (also often called "demand-based") the routing algorithm to be implemented at any point in time is dependent on a demand or need basis. Thus, this approach can be seen as reactionary where the routing adapts depending on the traffic requirements of the network. In contrast, a proactive approach assumes a uniform traffic distribution and the routing strategy is established beforehand. Often designers of a network need to decide whether they would prefer the flexibility offered by the reactionary approach, but which often incurs additional processing overheads associated with maintaining an updated topology of the various routes through a changing MANET network.

It should be understood that there are varying degrees of MANET networks. More specifically, certain networks have a very rapidly changing topology in which links are established and removed frequently, whereas for other networks the topology is more constant. Various embodiments of the present invention can be used across the spectrum between constant and dynamically changing networks. Thus, for a more constant network topology a proactive-based routing approach might be favoured, whereas in an alternative embodiment a reactive-based routing approach would be preferred for a dynamically changing network.

At one extreme, for example in a highly dynamically changeable MANET network, it would be typically be best to use a reactive approach to routing. That is, in such an embodiment upon receipt of a data packet each node needs to establish the topology of the network at that particular instant in time. To do this, the node sends out basic initialisation messages, for example "hello" messages, and waits for responses from surrounding nodes so that it is able to build up reactively the topology of the network at that time. This is well known in the art and will not be described further herein.

Once a current topology is established, each node decides which is the "best" path, assuming there is more than one, to be taken to reach the final destination. There are many well known algorithms used for path selection, which for example can be based on the shortest distance (number of hops) to the destination, the loading of a particular node or nodes in each path, the level of battery power of a particular node or nodes in each path, etc. Whatever the algorithm or criteria used for path selection, once the path has been selected the node is imbued with information indicating the distance (number of hops) to the final destination, in which the received data packets are forwarded accordingly based on priority information as will be described later. The next node in the selected path, will check to see that the current topology is still the same and if so will automatically decrease the distance to the destination (by subtracting one hop from the number of hops to the destination) and forward the packet accordingly based on priority information as will be described later.

The problem facing designers becomes compounded when one realises that MANET signalling or routing (reactive or proactive) tends to increase the larger the network becomes. The size and complexity of a MANET network can be roughly determined by the number of nodes in a network, the average degree of a network (i.e. the number of neighbouring nodes for a particular node), and the rate at which the MANET's topology is changing.

As already explained, by definition there cannot be a guaranteed QoS in the MANET networks since there is no guarantee of any connection in the network at any given point in time. Thus, strictly speaking it is more correct to work with the statistical nature of achieving a desired QoS in MANET networks or in other words, the probability of achieving a desired QoS. Due to the ever-changing nature of a MANET network, often high speed connections between a sending host and a receiving host may not be established or if as in fixed-line networks, the packets of such connection are prioritised this could easily ruin the throughput of the whole network. This is especially the case in high speed connections over long distances which by prioritising data may ruin the throughput of the entire MANET network.

According to a preferred embodiment, the nodes in a MANET network will receive data packets of the format shown in FIG. 3. Each data packet 30 contains header information 32 as shown. The router 20 within each node 10 is then able to forward each data packet using techniques that are well known in the art, for example using routing tables which determine the next best node onto which the data packet can be forwarded. The connection distance is the number of hops, which will need to be made for the packets to reach the destination host 14. The transmission of a packet from one router to another is known as a hop and it should be appreciated that the present application is capable of implementing the modern methods used by routers to forward packets for example, forwarding packets based on a defined per hop behaviour (PHB). In fixed-line networks and in some wireless networks (for example, Diffserv networks) packets may be forwarded according to category or priority information contained in a packet header. In the present embodiment, this category information includes bandwidth or bit rate information 36 representing the speed of the transmission and a distance field 38 within the priority information 34 of the packet header 32. In this way, each router node within a MANET network will forward packets based on priority information 34 which takes into account both the speed of connection 36 required (bit-rate) as well as the distance 38 to the final destination host. Using these two parameters 36,38 it is possible to offer a particular probability for achieving a desired QoS in MANET networks.

In many communication applications, packets are assigned to a particular data stream or class as in Diffserv networks so that packets being transmitted having different speeds fall into different classes. In one embodiment of the present invention the data packets through the MANET network can be grouped into three classes. Table 1 below shows how packets are categorised into their class depending on their speeds. In particular, a packet is assigned to a data speed class 1 if it has a bit rate greater than 1 mega bit per second. A packet is assigned to a data speed class 2 if there is a bit rate greater than 100 kilo bits per second but less than 1 mega bit per second. A data packet is categorised into a data speed class 3 if it has a bit rate between 0 and 100 kilo bits per second.

TABLE 1

| Data Speed Class | Bandwidth |
| --- | --- |
| Data speed class 1 | >1 Mbit/s |
| Data speed class 2 | 100 Kbit/s < 1 Mbit/s |
| Data speed class 3 | 0 Kbit/s-100 Kbit/s |

Two alternative embodiments of the present application for achieving different probabilities of a particular QoS are now described.

FIG. 4 shows a first embodiment of a table for implementing an even probability at QoS routing strategy the present invention. More particularly, the table in FIG. 4 is set up so that each node 10 in the MANET network can establish along with the priority information 34 how to forward each data packet so as to achieve an even probability of all packets passing through the network. To achieve an even probability of QoS the routing strategy is set up to allow the fair allocation of bandwidth capacity for all data packets depending on the speed 36 and distance 38 data contained within each packet header 32. As shown in FIG. 4, packets that are in data speed class 1 (>1 Mbit/s) and having only one more hop to reach their destination are determined to be of a high priority. Packets in data speed class 2 (>100 Kbits/s and <1 Mbit/s) and having two or less hops to reach their destination are also determined to be of a high priority. Packets in data speed class 3 (<100 Kbits/s) and having five or less hops to their destination are also determined to be of a high priority.

Each node in the MANET network will forward each packet depending on the priority determined for each packet. That is, packets having a high priority are given preference and are forwarded first. However, if there are several high priority packets to be forwarded the packets closest to the destination are then forwarded first. Next the node will look for packets having medium priority and if there are several of these the packets closest to the destination are forwarded first. Lastly, the lowest priority packets are forwarded, again those closest to their destination are forwarded first. The routing strategy in FIG. 4 tries to strike a compromise between the distance 38 and speed 36 parameters. In other words, to achieve an even probability of a desired QoS the greater the distance to the destination the less likely that a high priority will be given to packets in a high data speed class. The probability of a packet being assigned a high priority is an inverse relation between the distance and speed parameters. This solves the problem where high-speed traffic is presented from given priority for long connections.

FIG. 5 shows an alternative embodiment having a different routing strategy wherein the probability of achieving a desired QoS is now favoured for short connections. That is, from FIG. 5 it can be seen that each node will give preference to forwarding packets that are close to their destination (i.e. two or less hops) irrespective of the data speed class into which the packet is categorised. Also, packets which are further than two hops but less than or equal to five hops are given medium priority and are forwarded by each node in the MANET network in preference to packets having six or more hops to their destination, which are assigned the lowest priority. As in the embodiment of FIG. 4, if there is a plurality of packets having the same priority, preference is given to those packets closest to the destination.

In an alternative embodiment, it might be preferable for the distance information 38 to be comprised of the distance from the source node 12 in hops, as opposed to the distance to the destination node 14. That is, in many routing algorithms it is possible for each packet to contain a hop count of the number of hops that have been traversed from the source For example, in geolocation-type routing algorithms, although a node might not know the exact distance to the destination, the node might know the distance so far travelled from the hop count information Therefore, routing strategies for prioritising packets as shown in FIGS. 4 and 5 can be set-up, in which it can be presumed that packets that are near to a source have a relatively long distance to their destination. Alternatively, a further routing strategy might be that higher priority is given to packets that have just entered the network depending on each packet's bandwidth requirement. For example, assuming all data packets at a node have the same bandwidth requirements, it may be preferable to give a higher priority to packets that have travelled less than 5 nodes from the source node 12 (i.e. closer to the source), whereas a lower priority is given to packets that are already well into the network (i.e. greater than 5 hops).

It should be appreciated that the two embodiments shown in FIGS. 4 and 5 are only examples of the possible implementations of the present invention and that the distance and bandwidth information provide flexibility in allowing a routing strategy to be implemented, which best fits the requirements of a particular network. More particularly, the system designer is able to set up a particular routing strategy based on speed and distance information contained within each data packet and can decide on implementing a particular strategy, which might either be proactive or reactive. Moreover, although specific priority levels and three data speed classes were defined in the embodiments described herein, it should be appreciated that the present invention is flexible in that there can be more or less priority levels and the data speed classes can have different speed ranges depending on the requirements of a particular network.

The invention claimed is:
1. An apparatus, comprising:
   a processor, at a node of a wireless network including an ad-hoc network, configured to provide at least the following:

establish bandwidth information representing a speed of transmission for a data packet of a plurality of data packets, determine distance information for the data packet, said distance information comprising hop count information to a destination of the data packet;

use the bandwidth information to determine a priority indicator for transmitting the data packet over the wireless network including the ad-hoc network, and control transmission of the data packet based on the priority indicator, wherein the data packet is transmitted before another data packet of the plurality of data packets, when the data packet includes the priority indicator that is the same as another priority indicator of the another data packet and the data packet includes the distance information including the hop count representing that the data packet is closer to the destination than another destination of the another data packet.

2. An apparatus according to claim 1, wherein the processor is configured to determine the priority indicator based on distance information so that packets having a short distance are forwarded with highest priority when the packets have substantially equal bandwidth.

3. An apparatus according to claim 1, wherein said bandwidth and distance information are transmitted within a header portion of each data packet.

4. An apparatus according to claim 1, wherein the processor is configured to determine the priority indicator so that the priority indicator controls the order that a node forwards a received data packet so that packets having highest priority are forwarded first.

5. An apparatus according to claim 1, wherein the processor is configured to select the priority indicator from one of three priority levels being high, medium and low.

6. An apparatus according to claim 1, wherein for data packets having the same priority indicator, those having the shortest distance to the destination are transmitted before other data packets having a higher priority.

7. An apparatus according to claim 1, wherein said data packets are categorized into classes depending on their bandwidth requirements.

8. An apparatus according to claim 1, wherein said data packets are categorized into first, second and third data speed classes.

9. An apparatus according to claim 8, wherein said first data speed class is for data packets having a bit rate greater than 1 Mbit/s, said second data speed class having a bit rate between 100 kbit/s and 1 Mbit/s, and the third data speed class having a bit rate between 0 and 100 kbits.

10. An apparatus according to claim 1, wherein a proactive routing protocol is implemented and each data packet includes the distance information upon entry to the network.

11. An apparatus according to claim 1, wherein a reactive routing protocol is applied so that each node of the network is able to establish reactively the distance information.

12. An apparatus according to claim 1, wherein the distance information comprises the distance in hops from a source.

13. An apparatus, comprising:

means for establishing, at a node of a wireless network including an ad-hoc network, bandwidth information representing a speed of transmission for a data packet of a plurality of data packets;

means for determining, at the node, distance information for the data packet, said distance information comprising a hop count to the destination of the data packet;

means for using, at the node, the bandwidth information to determine a priority indicator for transmitting the data packet over the wireless network; and means for controlling, at the node, transmission of the data packet based on the priority indicator, wherein the data packet is transmitted before another data packet of the plurality of data packets, when the data packet includes the priority indicator that is the same as another priority indicator of the another data packet and the data packet includes the distance information including the hop count to the destination representing that the data packet is closer to the destination than another destination of the another data packet.

* * * * *